US009288039B1

(12) United States Patent
Monet et al.

(10) Patent No.: US 9,288,039 B1
(45) Date of Patent: Mar. 15, 2016

(54) PRIVACY-PRESERVING TEXT LANGUAGE IDENTIFICATION USING HOMOMORPHIC ENCRYPTION

(71) Applicant: Xerox Corporation, Norwalk, CT (US)

(72) Inventors: Nicolas Monet, Montbonnot-Saint-Martin (FR); Johan Clier, Meylan (FR)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/556,700

(22) Filed: Dec. 1, 2014

(51) Int. Cl.
*H04L 9/00* (2006.01)
*G06F 21/60* (2013.01)

(52) U.S. Cl.
CPC ............... *H04L 9/008* (2013.01); *G06F 21/60* (2013.01)

(58) Field of Classification Search
CPC combination set(s) only.
See application file for complete search history.

(56) References Cited

U.S. PATENT DOCUMENTS

| 5,062,143 | A | 10/1991 | Schmitt | |
|---|---|---|---|---|
| 6,167,369 | A | 12/2000 | Schulze | |
| 8,233,726 | B1 * | 7/2012 | Popat | G06K 9/6821 382/177 |
| 8,261,094 | B2 * | 9/2012 | King | G06F 21/606 711/163 |
| 2005/0289369 | A1 * | 12/2005 | Chung | G06F 1/3203 713/300 |
| 2014/0161255 | A1 * | 6/2014 | Tonegawa | H04L 63/1416 380/246 |

OTHER PUBLICATIONS

Brakerski, et al., "Fully homomorphic encryption without bootstrapping," Cryptology ePrint Archive, Report 2011/277, pp. 1-26 (2011).
Elgamal, "A Public Key Cryptosystem and a Signature Scheme Based on Discrete Logarithms," IEEE Transactions on Information Theory, vol. IT-31, No. 4, pp. 1-4 (1985).
Benaloh, "Dense Probabilistic Encryption," Proceedings of the workshop on selected areas of cryptography, pp. 120-128 (1994).
Paillier, "Public-Key Cryptosystems Based on Composite Degree Residuosity Classes," Eurocrypt '99, LNCS 1592, pp. 223-238 (1999).
Jurik, "Extensions to the Paillier Cryptosystem with Applications to Cryptological Protocols," Basic Research in Computer Science, pp. 1-118 (2003).
U.S. Appl. No. 14/278,570, filed May 15, 2014, Calapodescu, et al.

\* cited by examiner

*Primary Examiner* — Beemnet Dada
(74) *Attorney, Agent, or Firm* — Fay Sharpe LLP

(57) ABSTRACT

A system and method for text language identification allow private information of a server and a client to be kept secret from each other. An encrypted score for each of a plurality of languages is received by the server from the client. The encrypted scores are generated by homomorphic addition of encrypted frequencies of n-grams in a list of n-grams extracted from text. The unencrypted list is not provided to the server. The encrypted frequencies of the n-grams in the list are extracted using encrypted resources which, for each of the plurality of languages, include an encrypted frequency for each of a set of n-grams. At the server, the encrypted scores are decrypted to generate unencrypted scores and information is provided to the client based on the unencrypted scores from which the client is able to identify a language for the text.

18 Claims, 4 Drawing Sheets

PRIVACY-PRESERVING TEXT LANGUAGE IDENTIFICATION USING HOMOMORPHIC ENCRYPTION

BACKGROUND

The exemplary embodiment relates to language identification and finds particular application in identification of the language of text documents where the language identification is performed with encrypted resources.

Language identification is an automated process that enables the language of a document to be retrieved from among a given list of languages. This process is widely used in processing text documents, typically as a first step of the document processing chain.

However, a client seeking to have the language of a text document identified often does not want to send a confidential document to a server for performing the language identification. Additionally, the server often does not want the client to have access to the resources that it uses for language identification.

There remains a need for a system and method which allow language identification while retaining the confidentiality of both the text document and the language identification resources.

INCORPORATION BY REFERENCE

The following references, the disclosures of which are incorporated herein by reference in their entireties, are mentioned:

U.S. Pat. No. 5,062,143, issued Oct. 29, 1991, entitled TRIGRAM-BASED METHOD OF LANGUAGE IDENTIFICATION, by Schmitt, discloses a mechanism for examining a body of text and identifying its language by comparing successive trigrams into which the body of text is parsed with a library of sets of trigrams.

U.S. Pat. No. 6,167,369, issued Dec. 26, 2000, entitled AUTOMATIC LANGUAGE IDENTIFICATION USING BOTH N-GRAM AND WORD INFORMATION, by Schulze, discloses a method for identifying a predominant language of a sample text using probability data that include N-gram probability data and word probability data for at least one language.

Application Ser. No. 14/278,570, filed May 15, 2014, entitled COMPACT FUZZY PRIVATE MATCHING USING A FULLY-HOMOMORPHIC ENCRYPTION SCHEME, by Ioan Calapodescu, et al., discloses a system and method for data matching of data encrypted with a homomorphic encryption scheme.

BRIEF DESCRIPTION

In accordance with one aspect of the exemplary embodiment, a method for text language identification includes receiving, at a server, an encrypted score for each of a plurality of languages, from a client. The encrypted scores have been generated by homomorphic addition of encrypted frequencies of n-grams in a list of n-grams. The list of n-grams is extracted from text at the client and the list is not provided to the server. The encrypted frequencies of the n-grams in the list have been extracted based on encrypted resources which, for each of the plurality of languages, include an encrypted frequency for each of a set of n-grams. At the server, the encrypted scores are decrypted to generate unencrypted scores. Information is provided to the client based on the unencrypted scores from which the client is able to identify a language for the text.

At least one of the decrypting of the encrypted scores and the providing information may be performed by a processor.

In accordance with another aspect of the exemplary embodiment, a server for text language identification in cooperation with an associated client includes server memory which receives an encrypted score for each of a plurality of languages from the client. The encrypted scores have been generated by homomorphic addition of encrypted frequencies of n-grams in a list of n-grams, the list having been extracted from text at the client. The list is not provided to the server. The encrypted frequencies of the n-grams in the list have been extracted based on encrypted resources which, for each of the plurality of languages, include an encrypted frequency for each of a set of n-grams. A server decryption component decrypts the encrypted scores to generate unencrypted scores. An information output component provides information to the client based on the unencrypted scores from which the client is able to identify a language for the text. A processor implements the server decryption component and the information output component.

In accordance with another aspect of the exemplary embodiment, a method for text language identification includes receiving encrypted resources from an associated server. The encrypted resources include, for each of a plurality of languages, an encrypted frequency for each of a set of n-grams which have been generated with a key for a homomorphic addition scheme. Doubly-encrypted resources are generated from the encrypted resources by further encrypting at least some of the encrypted frequencies with a key for a homomorphic multiplication scheme and obfuscating corresponding n-grams in the set of n-grams. A list of n-grams is extracted from a text. The n-grams in the list of n-grams are obfuscated. The doubly-encrypted resources and obfuscated list of n-grams are provided to the server. A doubly-encrypted score for each of the languages is received from the server. The doubly-encrypted scores have been computed based on the obfuscated list of n-grams and the respective doubly-encrypted resource. The doubly-encrypted scores are decrypted with a key for the homomorphic multiplication scheme to generate encrypted scores. The encrypted scores are returned to the server. Information is received from the server based on unencrypted scores generated by the server from the encrypted scores. A language from the plurality of languages is identified for the text, based on the received information.

One or more of the steps of the method may be performed by a processor.

DETAILED DESCRIPTION

Systems and methods for language identification are disclosed which maintain the confidentiality of client and server information. In a first embodiment, language identification is performed primarily by the client, using encrypted resources provided by the server. In a second embodiment, the language identification is performed primarily by the server, but without access to the client's unencrypted data.

1. Client-Side Computation System

Figure 1:
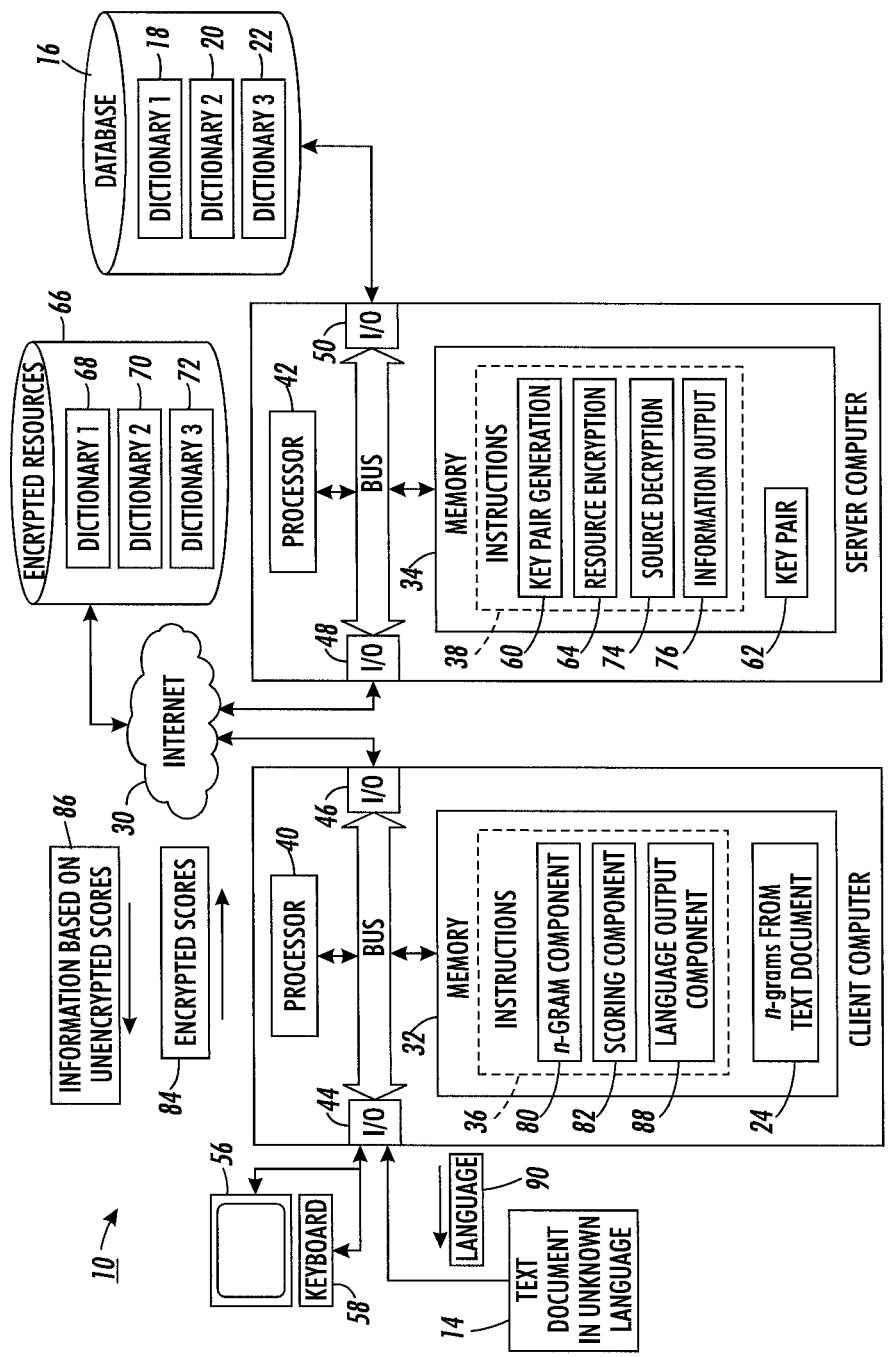
FIG. 1 is a functional block diagram of a system for language identification in accordance with one aspect of the exemplary embodiment.

With reference to FIG. 1, a system 10 for identifying the language of an encrypted document in accordance with a first aspect of the exemplary embodiment is illustrated. A user of a client computing device 12 has a text document 14 in an unknown natural language, such as English, French or the like, for which language identification is sought. A database 16 stores a set of n-gram dictionaries ("resources") 18, 20, 22, one dictionary for each of a set of candidate languages. The database 16 is not accessible to the client computing device 12.

Each dictionary 18, 20, 22 includes a set of n-grams extracted from a corpus of documents in the respective language, where n is a number greater than 1, such as 2, 3, or 4. Each n-gram includes the same number of characters drawn from a finite alphabet, such as any combination of letters, spaces, etc. Entire words may be characters in other embodiments. In the embodiments discussed below, n is 3 (trigrams). Each n-gram is associated, in the respective dictionary, with a value representing its frequency in the respective corpus. For example, for a corpus represented by the sentence: The cat sat on the mat. the following trigrams and their frequencies may be automatically extracted by parsing the corpus into all possible sequentially-occurring trigrams:

the (2), he_ (2), e_c (1), cat (1), at_ (2).

Here, the character "_" is used to represent a space between words and also to represent punctuation. However, in other embodiments, punctuation could be used as recognized characters. Whatever form of processing is agreed on by the server and client in advance so that the trigrams can be generated from the text 14 in the same way. As will be appreciated, the corpora from which n-grams are extracted in practice each include a large number of sentences in the respective language and thus the frequencies are based on a large number of instances, in many cases. In some embodiments, the dictionary includes frequencies for only the most frequently occurring n-grams in the corpus for the given language. Other n-grams are assigned a default frequency of null (which max correspond to a maxfrequency). The set of n-grams for a given dictionary may include at least 100 or at least 500 n-grams, such as up to 10,000 n-grams, or more.

While three dictionaries 18, 20, 22 (three languages) are illustrated, it is to be appreciated that any number of at least two (a "plurality") languages may be represented in the encrypted resources, such as 2, 3, 4, 5, or more languages. Additionally, instead of a plurality of dictionaries, a single dictionary may be generated which includes the n-gram scores for each of the considered languages as a table or similar data structure.

The text document 14 can be processed to extract a respective list 24 of n-grams. The n-grams may be stored as an unordered list with each occurrence of the n-gram having a respective entry in the list (n-grams occurring more than once thus are simply repeated in the list). The list of n-grams may include at least 50 or at least 80 n-grams, such as up to 1000 n-grams, or up to 200 n-grams (some of which may be repeats).

A server computer 28 has access to the dictionaries 18, 20, 22 stored in database 16 and is communicatively connected with the client computing device 12 via a network 30, such as a local area network or wide area network, such as the Internet.

While one client device 12 is shown, there may be many client computing devices 12 communicating with the same server 28.

Each computing device 12, 28 includes memory 32, 34, which stores appropriate instructions 36, 38, for performing the respective parts of the method, and a processor device 40, 42 in communication with the memory for executing the instructions. Input/output devices 44, 46, 48, 50 allow the computers to communicate with external devices. Hardware components 32, 34, 40, 42, 44, 46, 48, 50 of the respective computers are communicatively connected by a respective bus 52, 54. Client device 12 may be linked to a user interface comprising a display device 56, such as an LCD screen or computer monitor, and a user input device 58, such as a keyboard, keypad, touchscreen, or the like, which allows a user to input text and/or view the identified language or information generated based thereon.

In the embodiment of FIG. 1, the resources 18, 20, 22 are sent in encrypted form to the client, so that the language identification can be performed on the client device 12. In this embodiment, the server instructions 38 include a key pair generation component 60, which generates a key pair 62, and a resource encryption component 64, which encrypts the trigram frequencies using the key pair 62. For the encryption, an additive homomorphic algorithm, such as the Paillier or Benaloh cryptosystem, may be employed. The key pair includes a public key which may be shared with the client and a private (secret) key which is not provided to the client. The public and private keys form an asymmetric key pair 62. The two parts of this key pair are mathematically linked. The public key is used to encrypt plaintext to form ciphertext, but cannot decrypt it, whereas the private key is used by the server to decrypt ciphertext.

The resulting encrypted resources 66 comprising encrypted dictionaries 68, 70, 72 and the associated key pair 62, may be stored to be reused for each client. The encrypted dictionaries 68, 70, 72 are made accessible to the client 12, so that the client can retrieve or download them. The public key of the key pair 62 may be made available to the client for encryption of null frequencies.

The server instructions 38 also include a score decryption component 74 for decrypting encrypted scores to generate an unencrypted score for each candidate language and an information output component 76, which outputs information to the client based on the unencrypted scores.

The client instructions 36 include an n-gram (e.g., trigram) component 80, which generates a list of n-grams 24 based on the unencrypted document 14. A scoring component 82 computes an encrypted score 82 for each of the set of candidate languages, based on the identified n-grams 24 and the encrypted dictionaries 68, 70, 72. The encrypted scores are sent to the server 28 for decryption by the score decryption component 74. At least one of the resulting unencrypted scores or other information 86 based thereon is returned to the client by the server information output component 76. A language output component 88 of the client outputs a language 90 based on the information 86, which is generally the language 90 corresponding to the lowest of the decrypted scores, as being the most probable language.

The computers 12, 28 may each be a desktop, laptop, palmtop, tablet computer, portable digital assistant (PDA), server computer, cellular telephone, pager, combination thereof, or other computing device capable of executing the respective instructions for performing the exemplary method.

The memory 32, 34 may each represent any type of non-transitory computer readable medium such as random access memory (RAM), read only memory (ROM), magnetic disk or tape, optical disk, flash memory, or holographic memory. In one embodiment, the memory 32, 34 comprises a combination of random access memory and read only memory. The network interface 46, 48 allows the computer to communicate with other devices via the computer network 20, and may comprise a modulator/demodulator (MODEM) a router, a cable, and and/or Ethernet port.

The digital processors 40, 42 can be variously embodied, such as by a single-core processor, a dual-core processor (or more generally by a multiple-core processor), a digital processor and cooperating math coprocessor, a digital controller, or the like. Each digital processor 40, 42 in addition to controlling the operation of the respective computer 12, 28 executes instructions stored in respective memory 32, 34 for performing the method outlined in FIG. 2.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 2:
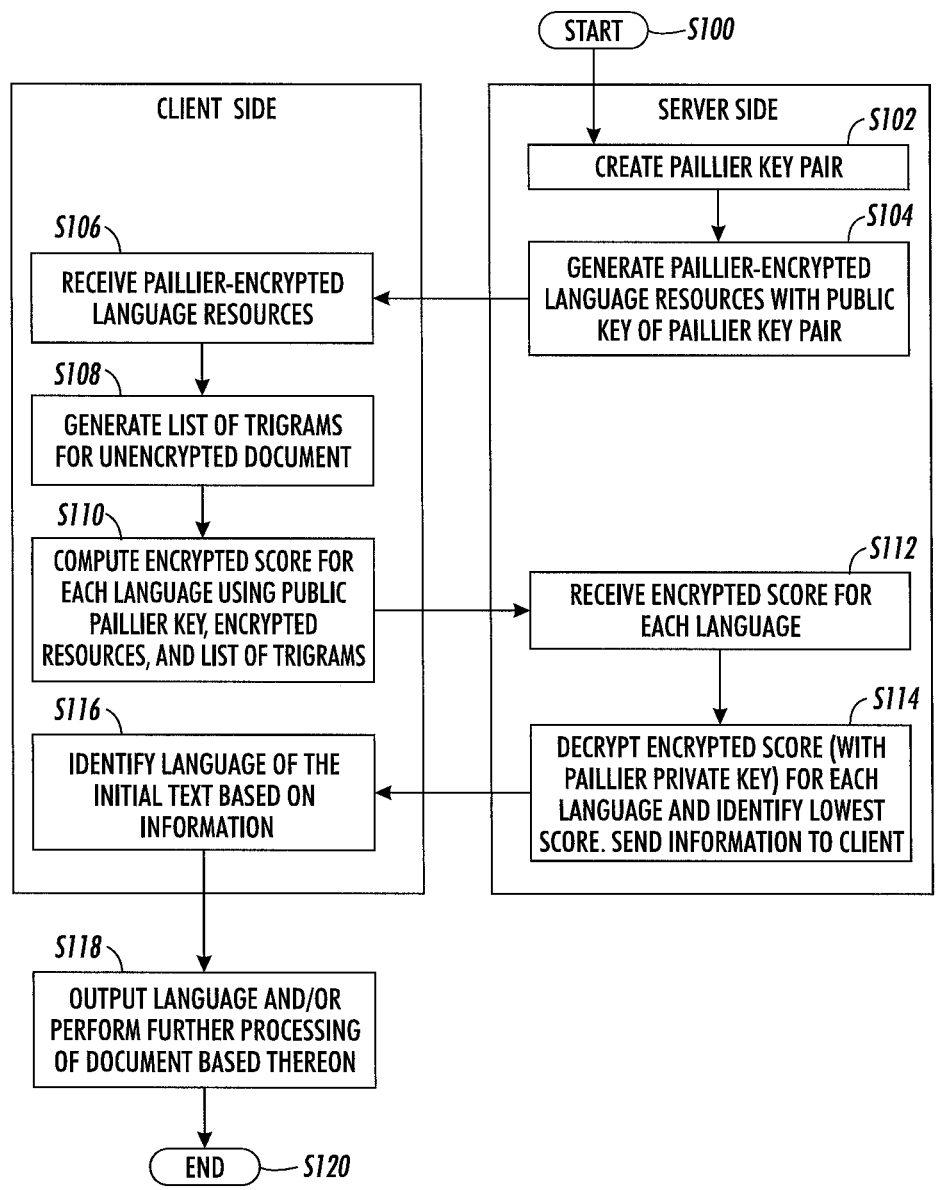
FIG. 2 is a flow chart illustrating a method for language identification in accordance with another aspect of the exemplary embodiment.

With reference to FIG. 2, a computer-implemented method for identifying the language of a document, which can be performed with the system of FIG. 1, is shown. Parts of the method that are performed on the client and server computing devices are indicated as such. The method begins at S100.

At S102, a key pair 62 is generated by the key pair generation component 60. In the exemplary embodiment, the key pair 62 is used for a homomorphic addition encryption scheme, such as Paillier.

At S104, each dictionary 18, 20, 22 is encrypted with the resource encryption component 64, for example, using the Paillier encryption scheme and the public key of the key pair 62, to generated encrypted dictionaries 68, 70, 72. In particular, the frequency for each n-gram is encrypted, while the n-grams themselves remain unencrypted (in plain text).

At S106, the encrypted resources 66, which include the encrypted trigram frequencies for each language, are made available to the client and are received or accessed by the client device 12.

As will be appreciated, steps S102 to S106 may be omitted for future interactions between the server and this particular client and the encrypted resources 66 may be reused.

The client device 12 cannot decrypt the encrypted trigram frequencies but can use them to compute encrypted scores for each of the candidate languages using the n-grams identified in the text document 14 and part of a language scoring algorithm, as described below.

At S108, n-grams in the unencrypted text document 14 are identified and listed by the client's n-gram component 80. It is not necessary to extract all n-grams, for example, a predetermined number, such as the first 100 n-grams, may be extracted as representative of the document 14. The unencrypted list of n-grams is not provided to the server.

At S110, for each of the set of languages, an encrypted score 84 is computed by the client side scoring component 82, based on the list of identified n-grams 24 and the encrypted dictionaries 68, 70, 72 using the same additive homomorphic encryption scheme as the server. For each language, the encrypted score is the encrypted sum of the encrypted frequencies for the trigrams in the list 24, which is generated by multiplying the encrypted frequencies. Step S110 may thus include, for each language:

a. Matching the trigrams in the list 24 with their respective entries in the encrypted resource 68, 70, or 72, and b. For each trigram in the list 24 in turn, multiplying the corresponding value (encrypted frequency from the resource) with the previous result. This corresponds to addition of the unencrypted frequencies, after decryption. For the first considered trigram in the list 24, the "result" is simply its encrypted frequency. The final result is an encrypted score 84 for each language.

In step S110, the public key of the key pair 62 may be used by the client for encryption of null frequencies, as discussed below.

At S112, the client 12 sends the encrypted scores 84 (one per dictionary) to the server 28 and the encrypted scores are received into memory by the server. The language corresponding to each score need not be identified to the server. For example, the encrypted scores are shuffled with the client keeping track of the position of each language.

At S114, the encrypted scores 84 are decrypted by the server score decryption component 74 to generate unencrypted (plain text) scores, one for each candidate language. The server information output component 76 outputs information 86 based thereon. For example, the information output component 76 may output the unencrypted score for each language or only the lowest score(s) corresponding to the most probable language(s) and/or other information 86 based thereon from which the client can identify the corresponding language. The information 86 is returned to the client. The information 86 output by the server allows the language 90 corresponding to the lowest score to be identified by the client. For example, the server identifies the position of the lowest scoring language.

At S116, the language output component 88 matches the unencrypted score(s) or position provided by the server to the corresponding language(s) and identifies the language having the lowest score as the recognized language for the document.

At S118, the recognized language 90 of the text document 14 may be output, e.g., to display device 56, and/or the text document 14 may undergo further processing on the client 12, or elsewhere, which takes into account the recognized language.

The method ends at S120.

Figure 3:
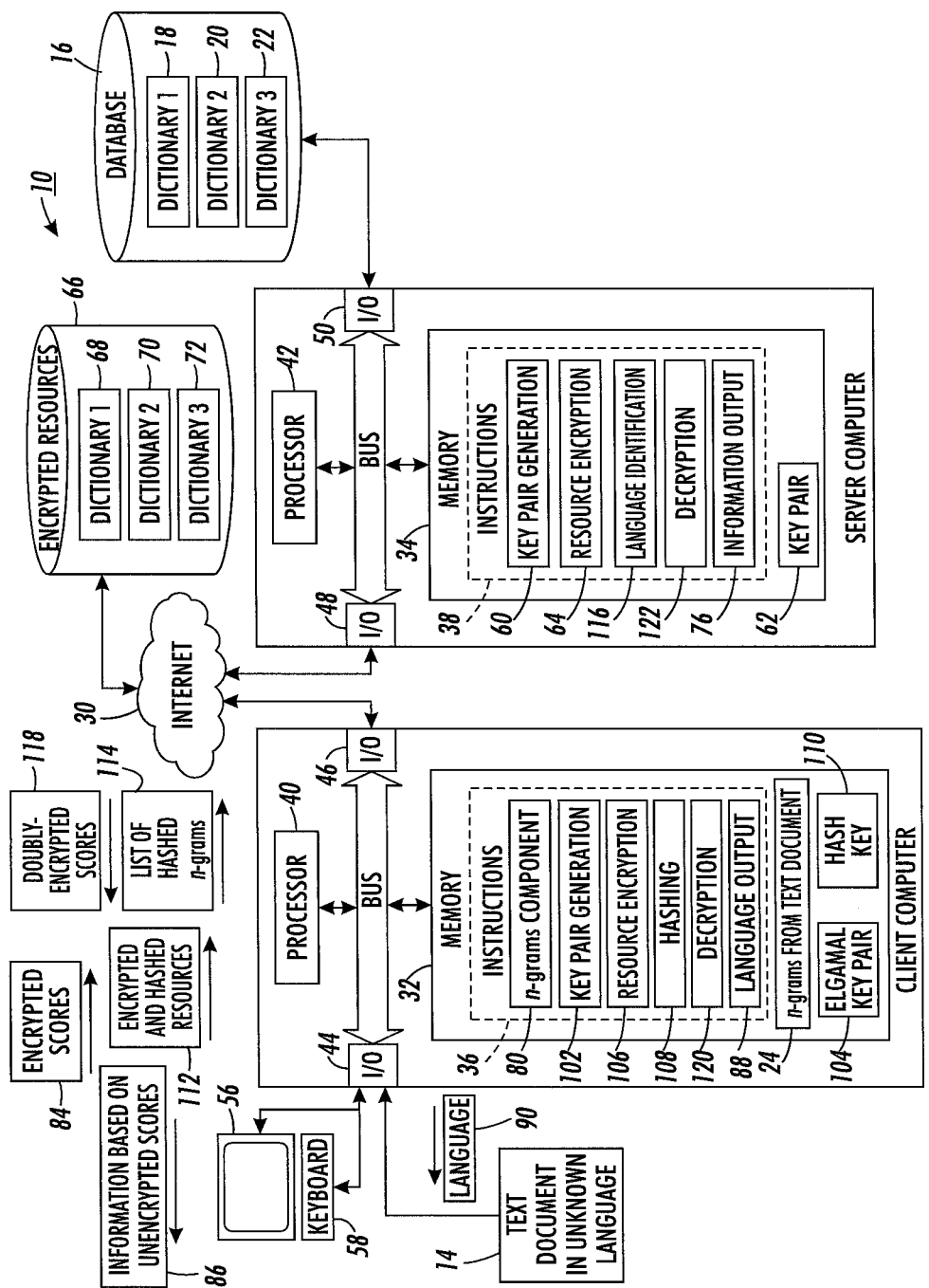
FIG. 3 is a functional block diagram of a system for language identification in accordance with another aspect of the exemplary embodiment.

2. Server-Side Computation:

FIG. 3 illustrates a system 100 for identifying the language of a document in accordance with another aspect of the exemplary embodiment. The system 100 can be similarly configured to system 10, except as noted. Similar components are given the same numbers.

In this embodiment, the language identification is executed primarily on the server side. This entails an algorithm which has more privacy requirements than the client side version discussed above, as the server should not know the final result.

In this embodiment, as for the embodiment of FIG. 1, the server instructions 38 include a key pair generation component 60, which generates a key pair 62, and a resource encryption component 64, which encrypts the trigram frequencies in the dictionaries 18, 20, 22 using the public key of the key pair 62. For the encryption of the resources, an additive homomorphic algorithm, such as the Paillier or Benaloh cryptosystem, may be employed. The encrypted dictionaries 68, 70, 72 are made accessible to the client 12, so that the client can retrieve or download them and access the encrypted n-gram values.

The client instructions include an n-gram component 80, which can be configured as discussed for the embodiment of FIG. 1. A client key pair generation component 102 creates a key pair 104 for homomorphic multiplication, such as an ElGamal key pair. A resource encryption component 106 encrypts the encrypted trigram frequencies of the encrypted resources 66, 68, 70 with the public key of the ElGamal key pair 104. Optionally, to provide further security, a hashing component 108 uses a hashing algorithm and a hash key 110 to hash all the entries (trigrams) of the resources. Alternatively, an encryption scheme such as the ElGamal key, or other method, may be used to obfuscate the entries. The client sends the doubly encrypted resources 112 comprising the doubly-encrypted frequencies and obfuscated trigrams to the server. In the exemplary doubly-encrypted resources 112, the n-gram frequencies are doubly-encrypted through additive homomorphic encryption (Paillier or Benaloh) and multiplicative homomorphic encryption (e.g., ElGamal). The server is thus unable to decrypt the resources 112, but can use them in a scoring algorithm.

The hashing component 108 also hashes the trigrams in the list 24 of trigrams using the same algorithm and the same parameters as for hashing the dictionary entries or otherwise obfuscates the trigrams. The client sends this list 114 of obfuscated trigrams to the server.

The server includes a language identification component 116 which executes the language identification algorithm, which produces a set of doubly-encrypted scores. The server sends the doubly-encrypted scores 118 (one per dictionary) to the client 12.

The client 12 includes a decryption component 120, which decrypts the doubly-encrypted scores 118, and sends the resulting encrypted scores 84, one for each language (which are still encrypted with the server's encryption) back (shuffled) to the server.

The server 28 includes a decryption component 122, which decrypts the encrypted scores 84 to generate unencrypted scores, and an information output component 74 which sends back the position of the lowest unencrypted score(s) and/or other information 86 based on the unencrypted scores.

The client output component 88 identifies the language of the text using the position or other information 86 sent by the server.

Figure 4:
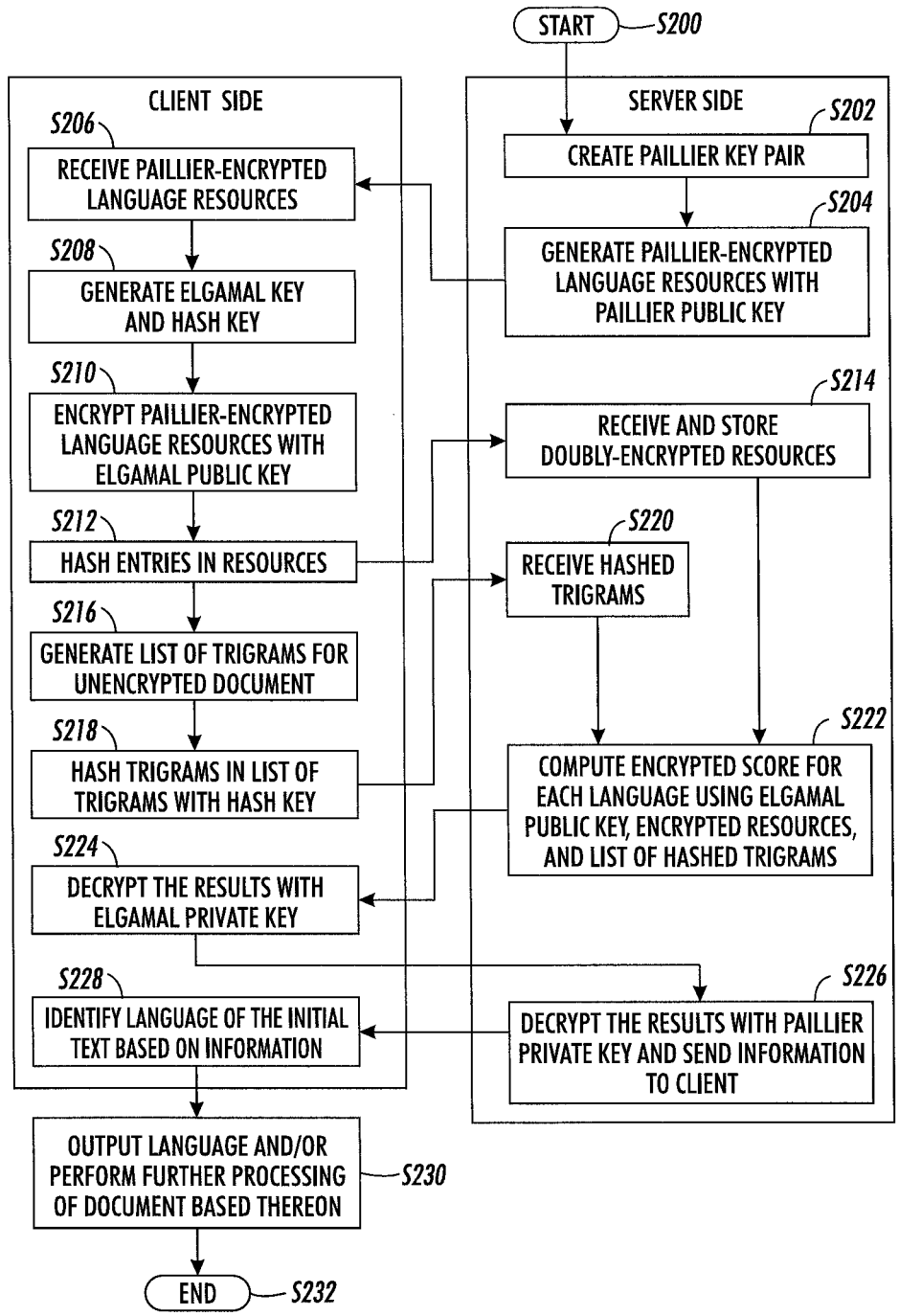
FIG. 4 is a flow chart illustrating a method for language identification in accordance with another aspect of the exemplary embodiment.

FIG. 4 illustrates a method which can be performed with the system of FIG. 3.

The method begins at S200. At S202, a key pair 62 is generated by the server key pair generation component 60, as for S102. In the exemplary embodiment, the key pair 62 is used for encryption/decryption and homomorphic addition and is referred to as the Paillier key pair 62.

At S204, each dictionary 18, 20, 22 is encrypted by the resource encryption component 64, using the Paillier encryption scheme and the public key of the Paillier key pair 62, as for S104.

At S206, the resulting encrypted trigram frequency resources 66, 68, 70 are transferred to the client 12, as for S106. The received resources include an unencrypted list of trigrams and their associated encrypted frequencies.

At S208, the client creates a key pair 104 for homomorphic multiplication, such as an ElGamal key pair 104, and optionally a hash key 110.

At S210, the client further encrypts the encrypted trigram frequency resources 66, 68, 70, with the public key of the ElGamal key pair 104. As a result, the trigram frequencies in the doubly-encrypted resources are encrypted twice, first with Paillier and then with ElGamal. As explained below, homomorphic multiplication of these doubly-encrypted frequencies achieves addition of the original frequencies, when the results are twice decrypted.

At S212, the client hashing component 108 hashes or otherwise obfuscates all the trigram entries (the trigrams themselves) of the encrypted resources 66, 68, 70, so that each entry has a unique value (or at least the entries that will be needed by the server for the language detection). The order of the hashed trigrams in the dictionaries is also shuffled. In this way, the server does not know what the trigrams are in the encrypted resources.

At S214, the client 12 sends the doubly-encrypted and hashed resources 112 generated at S210, S212 to the server. As will be appreciated, once steps S202-S214 have been performed, they need not be repeated for the same client.

At S216, an unencrypted list 24 of n-grams is generated by the n-gram component 80, as for S108. The unencrypted list of n-grams is not provided to the server.

At S218, the client hashing component 108 hashes or otherwise obfuscates the n-grams in the list 24 of its n-grams using the same hash key and the same parameters as used in S212. The n-grams in the resulting list 114 of hashed n-grams thus have the same hash values as they do in the encrypted resources. Given a hashed n-gram, the server can match it to one of the hashed n-grams in one of the encrypted dictionaries and retrieve its corresponding doubly encrypted frequency therefrom.

At S220, the client 12 sends the list 114 of hashed or otherwise obfuscated n-grams to the server and the server receives the list 114 of hashed n-grams into memory 34.

At S222, language identification is performed by the server language identification component 116 with the language identification algorithm, which includes, for each language:
  a. Matching the hashed n-grams in the list 24 with their respective entries in the encrypted and hashed resources 112, and
  b. Multiplying the corresponding value (doubly-encrypted frequency) with the previous result (resulting in addition of the unencrypted frequencies after double decryption).

The public key of the key pair 62 may be used for encryption of null frequencies, either by the client or by the server.

At S224, the server 28 sends the results 118 (one per dictionary) back to the client. The results include the doubly-encrypted score for each dictionary, which is encrypted in both ElGamal and Paillier.

At S226, the client decryption component 120 decrypts the results 118, using the private key of the ElGamal key pair 104, and sends the results 84 back (still encrypted with the Pallier encryption), shuffled to the server, as for S112. The server thus does not know which language corresponds to which encrypted score.

At S228, the server decryption component 122 decrypts the results 84 and sends back the position of the lowest decrypted score(s), or other information 86, as for S114.

At S230, the client output component 88 identifies the language 90 of the text using the position or other information sent by the server and outputs the identified language. The text document 14 may undergo further processing on the client 12, or elsewhere, which takes into account the recognized language.

The method ends at S232.

The method illustrated in FIGS. 2 and/or 4 may be implemented in a computer program product or products that may be executed on computers 12, 28. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computers 12, 28, (for example, an internal hard drive of RAM), or may be separate (for example, an external hard drive operatively connected with the computers 12, 28), or may be separate and accessed via a digital data network such as a local area network (LAN) or the Internet (for example, as a redundant array of inexpensive of independent disks (RAID) or other network server storage that is indirectly accessed by the computers 12, 28, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary methods may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing at least a part of the flowchart shown in FIG. 2 or FIG. 4, can be used to implement the method. As will be appreciated, while the steps of the method may all be computer implemented, in some embodiments one or more of the steps may be at least partially performed manually.

As will be appreciated, the steps of the method need not all proceed in the order illustrated and fewer, more, or different steps may be performed.

Further details on the exemplary systems and methods will now be provided.

Language Identification

The language identification process employed in the method of FIGS. 2 and 4 uses, as resources, dictionaries 18, 20, 22 (one for each language). These resources are generally trained using a corpus. For each language, the count of each trigram in the corpus is computed and only the most frequent trigrams with frequency above a threshold are retained. The frequency of a retained trigram may be obtained by summing the counts of all retained trigrams for the language and dividing the trigram's count by the total number of trigrams. The value is normalized with a logarithm function and filtered to be between 0 (indicating a very frequent trigram) and 20.

For example for English, "the", and "and" appear as very frequent trigrams, so have a low frequency (see TABLE 1, where _ indicates a space).

TABLE 1

| Example Trigrams | | | |
|---|---|---|---|
| English Frequency Sample | | French Frequency Sample | |
| _th | 4.08 | _de | 4 |
| he_ | 4.12 | es_ | 4 |

TABLE 1-continued

| Example Trigrams | | | |
|---|---|---|---|
| English Frequency Sample | | French Frequency Sample | |
| the | 4.16 | de_ | 4.3 |
| ed_ | 4.7 | le_ | 4.7 |
| nd_ | 4.86 | nt_ | 4.75 |
| and | 5 | _le | 4.8 |
| _of | 5 | _la | 5 |
| ... | | ... | |

In the embodiment of FIGS. 1 and 3, the language identifier algorithm loops on text trigrams, and calculates the sum for each language. Pseudocode for a basic language identification algorithm which can be adapted to use in the methods of FIGS. 2 and 4 is show in Algorithm 1:

---
Algorithm 1
---
1. Dictionary<string, number> results;
2. List<string> trigrams = generateTrigrams(text);
3. foreach (string language in Languages)
4.    Dictionary<string, number> trigramFrequency = get TrigramFrequency(language);
5.    number sum = 0;
6.    foreach(string trigram in trigrams)
7.      number frequency = trigramFrequency[trigram];
8.      if (frequency ≠ null)
9.        sum = sum + frequency;
10.     else
11.        sum = sum + maxFrequency;
12.    results[language] = sum;
13. string bestLanguage = getBestLanguage(results);

---

At line 1, a dictionary is provided for each language.

At line 2, the list 24 of trigrams (n-grams) is generated for an input text string 14.

At line 3, for each language in the set of languages, the algorithm proceeds through lines 4-12.

At line 4, the trigram frequency for each trigram and each language is computed and stored for the retained trigrams and a null value for all others).

At line 5, the sum (score) for each language is initially set to 0.

At line 6, for each trigram in the list of trigrams, lines 7-11 are performed.

At line 7, the trigram frequency is retrieved from the dictionary 68, 70, or 72 for that language.

At line 8, if the retrieved frequency is not equal to null (i.e., it is one of the retained trigrams) then at line 9, the frequency for that trigram is retrieved from the appropriate dictionary is added to the current sum.

At line 10, if the frequency is null (i.e., the trigram does not appear among the most frequently occurring n-grams in the corpus), then at line 11, the maxfrequency (a large value) is added to the current sum. The effect of this is to make it less likely that the language under consideration will be chosen for the document.

At line 12, the result for that language is the sum after all trigrams in the list have been processed.

At line 13, the most probable language is the language with the lowest sum.

An algorithm that combines trigram frequency and word frequency is described in U.S. Pat. No. 6,167,369. In the present case, trigrams and words can also be combined.

In the present system and method, the algorithm is performed, in part, by different entities. In the embodiment of FIGS. 1 and 2, the server 28 generates the trigram frequencies (line 4), but the client 12 prepares the trigram list (line 2) and computes the encrypted sum (lines 8-12), using the additive encryption scheme, leaving the server to decrypt the sum, from which the client can identify the best language. In the embodiment of FIGS. 3 and 4, the server generates the trigram frequencies (line 4), and computes the encrypted sum (lines 8-12) using the multiplicative encryption scheme, while the client prepares the list of trigrams (line 2) and retrieves the encrypted trigram frequencies (line 7). The identification of the best language (line 13) is performed in part by the client, through decryption with the multiplicative encryption key, and in part by the server, through decryption with the additive encryption key.

Homomorphic Encryption Schemes

Homomorphic encryption schemes useful herein allow a specified mathematical operation to be performed on encrypted data. The resulting ciphertext, when decrypted, contrary to classical encryption schemes, provides a value that is equal to the result of performing the same operation on the original plaintexts. For an encryption scheme E, the values a and b and an operator op, a homomorphic encryption property can be expressed as follows:

$$\epsilon(a) op \epsilon(b) = \epsilon(a \ op \ b)$$

The operator can be a standard mathematical operator, such as multiplication or addition. In some cases, the operator can be different on each side of the equation, e.g., the multiplication of encrypted data can correspond to the addition of the plaintext.

$$\epsilon(a) op \epsilon(b) = \epsilon(a \ op \ b)$$

An encryption scheme is considered partially homomorphic if only one arithmetic operation is possible (e.g., only addition or only multiplication). The Paillier cryptosystem is a semantically secure, additively homomorphic public-key cryptosystem. See, Pascal Paillier, "Public-key cryptosystems based on composite degree residuosity classes," EURO-CRYPT99, pp. 223-238 (1999). These systems provide ciphertext additions and scalar multiplication only, but not multiplication between ciphertexts. The ElGamal encryption system is a multiplicative homomorphic asymmetric key encryption algorithm, which is based on the Diffie-Hellman key exchange. See, Taher ElGamal (1985). "A Public-Key Cryptosystem and a Signature Scheme Based on Discrete Logarithms," *IEEE Transactions on Information Theory* 31 (4): 469-472.

In an exemplary embodiment, both the Paillier and ElGamal encryption schemes are employed. Homomorphic schemes that are somewhat or fully homomorphic may also be employed. They are able to perform both multiplications and additions within the same scope. Furthermore, the fully homomorphic schemes are able to do it an indiscriminate number of times while only a fixed amount of these operations can be performed with somewhat homomorphic schemes. Other homomorphic operations are possible, e.g., exclusive or in the case of the Goldwasser Micali encryption scheme or vector rotation for the Brakerski-Gentry-Vaikuntanathan (BGV) encryption scheme. See, Zvika Brakerski, et al., "Fully homomorphic encryption without bootstrapping," Cryptology ePrint Archive, Report 2011/277 (2011).

TABLE 2 summarizes the operation of some of these encryption schemes:

TABLE 2

Homomorphic encryption Schemes

| Cryptosystem | Homomorphic operations | Notes |
|---|---|---|
| Paillier | $\epsilon(a) \cdot \epsilon(b) = \epsilon(a + b \ mod \ m^2)$ | m being the modulus part of the public key |
| ElGamal | $\epsilon(a) \cdot \epsilon(b) = \epsilon(a \cdot b)$ | homomorphic multiplication |
| Goldwasser-Micali | $\epsilon(a) \cdot \epsilon(b) = \epsilon(a \oplus b)$ | $\oplus$ being the exclusive-or between a and b |
| Brakerski | addition and multiplication | Somewhat homomorphic encryption |

In one embodiment described herein, an additive (e.g., Paillier or Benaloh) encryption scheme is employed. In another embodiment described herein, both additive (Paillier, Benaloh), and multiplicative (e.g., ElGamal) encryption schemes are employed. The Benaloh cryptosystem is an extension of the Goldwasser-Micali cryptosystem. The main improvement of Benaloh over Goldwasser-Micali is that longer blocks of data can be encrypted at once, rather than individually.

The encryption of the trigram frequencies is performed with an additive homomorphic algorithm, such as Paillier or Benaloh. The server generates a key pair for encrypting the dictionaries 18, 20, 22. These encrypted dictionaries 66, 68, 70 (and the associated keys) are stored to be reused for each client. The client is able to retrieve or download the encrypted dictionaries.

1. Client-Side Computation:

In the embodiment of FIGS. 1 and 2, the server sends the resources encrypted to the client, so that the client can perform the language identification with the language identification algorithm.

The encrypted resources are stored as numerical strings that are much longer than the original n-gram frequencies, e.g., as shown in the following examples:

og__ 31509914215788162675645633210514940455253782495849004221175530749426764084495
rpa 99093422551409762379652887937224030932589367439534895756981324074214219970 88
amr 14472908960857704167728014132920229489238421048902073776051749106110994639082
cot 172420447854879565299661184539378705917191815013858769077605051484130318 66742
irc 380285041078482927105219515554525840913622993339217592453661442177833226 6394

The public key of the key pair 62 may be used for encryption of null frequencies (where there is no corresponding frequency in the encrypted resources).

Due to the homomorphic nature of the Paillier cryptosystem, the client can perform the language identification part of algorithm 1. The output of the algorithm includes different encrypted scores that can be sent to the server for decryption. The client then keeps the lowest of these values.

One disadvantage of this method is that the client needs to have and also code the language identifier algorithm. It also needs to perform the language identification operations (S110), which does involve CPU power even if the algorithm does not consume much CPU power.

The privacy of the client's data is ensured by the fact that the server never has access to the client data. The security of this scheme is based on the homomorphic scheme chosen.

2. Server-Side Computation:

In this embodiment, the language identification part of the algorithm is executed on the server side. This method has more privacy requirements than the client side version discussed above, as the server should not know the final result. This is achieved by further encrypting the encrypted resources on the client side, e.g., with a homomorphic multiplicative cryptosystem, such as ElGamal. The ElGamal key size should be big enough to allow no loss of information of the Paillier encrypted data. To send texts of a maximum size of 100 trigrams, an ElGamal key which is a hundred times bigger than the Paillier key may be chosen.

For the hashing steps (S212, S218), the client can for example choose SHA-256/512 as a secure hashing algorithm. The resources send back to the server at S214 may then be as follows, where both the n-gram and its frequency are encrypted as much longer strings:
15487612690256994562
45825464340750420654650506415640514501654108794647279146958946208756895612147
45123464597576191305464916142420546721
6514642146064276513
42365845956140626656
41451243145094303476190542034519034721006431061949736310
74156942358444785651
12457819031424510814910345191643476161247213032149434243
04518954702359410575
12457819143427591060314364767951202
4273184724912424761981
. . .

The public key of the key pair 62 may be used by client for encryption of null frequencies.

The server cannot retrieve the trigram associated to the trigram frequency (because the trigram is hashed on the client side), but the server can still compute the sum in the language identification algorithm. To do so, the server multiplies the ElGamal encrypted value. The server computes the sum and returns the ElGamal encrypted results to the client (S222).

For the trigram hashing step (S218) the client may generate and send its trigrams as a hash as follows:
42365845956140626656, 74156942358444785651, . . .

For steps S224, the client decrypts the k ElGamal results, where k is the number of languages that the system supports. The client then shuffles them and sends these Paillier encrypted values to the server for decryption to retrieve the best language. The position of each language after the shuffle is stored on the client side. The server decrypts all the results and then sends back the position of the lowest value. As the client knows what language is in what position after the shuffle, the client retrieves the text's language.

Using this method, the server has no access to the actual language of the text. It ensures more privacy for the client.

If a client wishes to perform several language identifications, the method may return to step S216, since there is no need to resend and re-encrypt the dictionaries.

Correctness

A proof that the exemplary method identifies the correct language follows.

First a description of how an encryption scheme such as Paillier or Benaloh works will be given, with specific reference to the Paillier system.

1. Encryption

Let m be the value to encrypt, $r \in Z_p^*$ a random value, and p the public key.

Then the following ciphertext is computed:

$$c = g^m * r^p \bmod p^2$$

Homomorphic Property

To compute the addition, the ciphertexts are multiplied as follows:

$$\varepsilon(m_1) * \varepsilon(m_2) = c_1 * c_2$$
$$= g^{m_1} * r_1^p * g^{m_2} * r_2^p \bmod p^2$$
$$= g^{m_1+m_2} * r_1^p * r_2^p \bmod p^2$$
$$= \varepsilon(m_1 + m_2)$$

This means that the decryption will produce $m_1 + m_2$, which is the addition of the two clear texts.

When using ElGamal, or any multiplicative scheme, on top of this encryption, this homomorphic property is retained.

ElGamal Encryption

Let m be the value to encrypt, $y \in \{1, \ldots, q-1\}$ a random value, and $h^y$ the public key.

Then the following ciphertext is computed:

$$(c_1, c_2) = (g^y, m * h^y)$$

$$\varepsilon(m_1) * (m_2) = (c_1^1, c_2^1) * (c_1^2, c_2^2)$$
$$= (g^{y_1} * g^{y_2}, m_1 * h^{y_1} * m_2 * h^{y_2})$$
$$= (g^{y_1+y_2}, m_1 * m_2 * h^{y_1+y_2})$$
$$= \varepsilon(m_1 + m_2)$$

ElGamal with Paillier

Using the previous sections, the following result can be employed:

$$\varepsilon_{ElGamal}(\varepsilon_{Paillier}(m_1)) * \varepsilon_{ElGamal}(\varepsilon_{Paillier}(m_2))$$
$$= \varepsilon_{ElGamal}(\varepsilon_{Paillier}(m_1) * \varepsilon_{Paillier}(m_2))$$
$$= \varepsilon_{ElGamal}(\varepsilon_{Paillier}(m_1 + m_2))$$

This means that when the ElGamal multiplication is computed in S222, at the same time the initial data is added. Using this particular property, a correct result is output in the language identification algorithm.

Security

The hashing function chosen should be one which is secure. The parameters used, such as the salt, are not disclosed to the server. The goal is only to blind the entry, while still allowing the server to match the encrypted dictionaries with the text to perform the language identification algorithm. This ensures privacy for the client data.

Moreover, the use of two encryption schemes in the second method reduces the likelihood of frequency-based attacks. Indeed, if the server receives a partial dictionary containing frequencies that it can decrypt, the server provider could be able to reconstruct the client text based on the initial dictionary coupled with a frequency analysis of the trigrams.

In the present case, the server is not able to access the clear value of intermediate frequency values he is using. Indeed, they are encrypted by the client's ElGamal private key, therefore ensuring their privacy. This means that, as long as the encryption protocol chosen by the client for its trigram encryption is secure, the server has no means to analyze the text or the frequencies to find them.

The security of the use of ElGamal and Paillier cryptosystems is discussed in Mads J. Jurik, PhD Dissertation, "Extensions to the Paillier Cryptosystem with Applications to Cryptological Protocols," pp. 13-16 and 30-33 (2003).

The system and method of FIGS. 1 and 2 provide the ability to perform text language identification in a privacy preserving protocol on client side to preserve client data.

The system and method of FIGS. 3 and 4 provide the ability to perform text language identification in a privacy preserving protocol on the server side to preserve client and server data. The privacy of the result of this operation is also preserved, meaning the server has no access to the actual language of the client text.

As will be appreciated, the algorithm when used on encrypted data performs less efficiently than the basic language identification algorithm. Since the algorithm has to manipulate encrypted data, it takes more time to compute the algorithm.

Efficiency can be improved if the client only sends the relevant double encrypted frequencies once he receives the dictionary (i.e., performing S210 and S212 after S216). This can reduce the amount of data exchanged on the network and remove the need for a hashing algorithm.

Other systems using asymmetric algorithm are often flawed as the server could work as a decryption oracle or the client could has to ask the server for a value compared to one he knows until he is sure of the value of an unknown encrypted value. In the present methods, such problems are minimized since the client is not given access to the Paillier public key. Thus the client cannot forge values to be compared.

As will be appreciated, rather than using an asymmetric scheme, the Paillier or Benaloh key pair could be replaced by a symmetric homomorphic algorithm with the same properties, i.e., only one key.

The Benaloh encryption scheme has some advantages over Paillier since it allows the same homomorphic operations, but with ciphertext of a size n instead of $n^2$. A smaller ElGamal key could then be chosen, allowing the language identification to be performed faster.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for text language identification comprising:
at a server, receiving an encrypted score for each of a plurality of languages from a client, the encrypted scores having been generated by homomorphic addition of encrypted frequencies of n-grams in a list of n-grams extracted from text at the client, wherein the list is not provided to the server, the encrypted frequencies of the n-grams in the list having been extracted based on encrypted resources which, for each of the plurality of languages, include an encrypted frequency for each of a set of n-grams;
at the server, decrypting the encrypted scores to generate unencrypted scores; and
providing information to the client based on the unencrypted scores from which the client is able to identify a language for the text,
wherein at least one of the decrypting of the encrypted scores and the providing information is performed by a processor.

2. The method of claim 1, wherein the encrypted resources are provided to the client.

3. The method of claim 2, wherein the client retrieves the encrypted frequencies of the n-grams in the list of n-grams from the encrypted resources and performs the homomorphic addition.

4. The method of claim 2, wherein the client further encrypts the encrypted frequencies of the n-grams in the encrypted resources with a key for homomorphic multiplication.

5. The method of claim 2, wherein the server receives doubly-encrypted resources from the client generated from the encrypted resources provided to the client, the doubly-encrypted resources including doubly-encrypted frequencies generated by further encrypting the encrypted frequencies of n-grams in the encrypted resources with a key for homomorphic multiplication.

6. The method of claim 5, wherein the n-grams associated with the doubly-encrypted frequencies are obfuscated and wherein the server receives an obfuscated list of trigrams from the client generated by the client from the list of trigrams.

7. The method of claim 6, wherein the server generates a doubly-encrypted score based on the obfuscated list of trigrams and corresponding doubly-encrypted frequencies from the doubly-encrypted resources and sends the doubly-encrypted score to the client for decryption to generate the encrypted score.

8. The method of claim 5, wherein the doubly-encrypted frequencies are encrypted with a homomorphic additive encryption scheme selected from Paillier and Benaloh encryption and with ElGamal homomorphic multiplicative encryption.

9. The method of claim 5, wherein the doubly-encrypted frequency for each of the n-grams in each set of n-grams is generated with a key for homomorphic multiplication which is not provided to the server.

10. The method of claim 1, wherein the encrypted frequency for each of the n-grams in each set of n-grams in the encrypted resources is generated with a key for homomorphic addition which is not provided to the client.

11. The method of claim 1, wherein the encrypted frequencies and encrypted scores are encrypted with a homomorphic additive encryption scheme selected from Paillier and Benaloh.

12. The method of claim 1, further comprising, at the server, generating a key for encryption which allows homomorphic addition of encrypted values and encrypting trigram frequencies of unencrypted resources with the key to generate the encrypted resources.

13. The method of claim 1 wherein the language associated with each of encrypted scores is not provided to the server.

14. The method of claim 1, wherein the provided information includes a position of one of the unencrypted scores.

15. The method of claim 1, wherein the plurality of languages comprises at least three languages.

16. A server for text language identification in cooperation with an associated client comprising:
server memory which receives an encrypted score for each of a plurality of languages from a client, the encrypted scores having been generated by homomorphic addition of encrypted frequencies of n-grams in a list of n-grams extracted from text at the client, which list is not provided to the server, the encrypted frequencies of the n-grams in the list having been extracted based on encrypted resources which, for each of the plurality of languages, include an encrypted frequency for each of a set of n-grams;

a server decryption component for decrypting the encrypted scores to generate unencrypted scores; and an information output component which provides information to the client based on the unencrypted scores from which the client is able to identify a language for the text; and a processor which implements the server decryption component and the information output component.

17. A method for text language identification comprising:

receiving encrypted resources from an associated server, the encrypted resources comprising, for each of a plurality of languages, an encrypted frequency for each of a set of n-grams, the encrypted frequencies having been generated with a key for a homomorphic addition scheme;

generating doubly-encrypted resources from the encrypted resources by further encrypting at least some of the encrypted frequencies with a key for a homomorphic multiplication scheme and obfuscating corresponding n-grams in the set of n-grams;

extracting a list of n-grams from a text;

obfuscating the n-grams in the list of n-grams;

providing the doubly-encrypted resources and obfuscated list of n-grams to the server;

receiving a doubly-encrypted score for each of the languages from the server computed based on the obfuscated list of n-grams and the respective doubly-encrypted resource;

decrypting the doubly-encrypted scores with a key for the homomorphic multiplication scheme to generate encrypted scores;

returning the encrypted scores to the server;

receiving information from the server based on unencrypted scores generated by the server from the encrypted scores; and identifying a language from the plurality of languages for the text based on the received information, wherein at least one of the generating doubly-encrypted resources and the decrypting of the doubly-encrypted scores is performed by a processor.

18. The method of claim 17, wherein the obfuscation of the n-grams in the set of n-grams and in the list of n-grams is performed with a same hashing algorithm and a same hash key.

* * * * *